United States Patent [19]

Bender

[11] Patent Number: 5,179,920
[45] Date of Patent: Jan. 19, 1993

[54] CIRCUIT FOR AUTOMATIC SHUT-DOWN OF ELECTRONICALLY CONTROLLED DIESEL ENGINE

[75] Inventor: Burnell L. Bender, Woodburn, Ind.

[73] Assignee: Navistar International Transportation Corp., Chicago, Ill.

[21] Appl. No.: 849,852

[22] Filed: Mar. 12, 1992

[51] Int. Cl.⁵ .............................................. F02B 77/08
[52] U.S. Cl. ............................................... 123/198 DB
[58] Field of Search ............ 123/41.15, 196 S, 198 D, 123/198 DB

[56] References Cited

U.S. PATENT DOCUMENTS

| | | | |
|---|---|---|---|
| 3,602,207 | 8/1971 | Kilmer | 123/179 |
| 3,964,018 | 6/1976 | Strait et al. | 340/52 F |
| 4,556,029 | 12/1985 | Yamaguchi et al. | 123/41.15 |
| 4,630,588 | 12/1985 | Sagawa | 123/198 D |
| 4,648,364 | 3/1987 | Wills | 123/198 D |

Primary Examiner—Noah P. Kamen
Attorney, Agent, or Firm—Dennis K. Sullivan

[57] ABSTRACT

An engine diagnostic testing procedure requires that the fuel shut-off solenoid valve remain connected to the engine's electronic control module during diagnostic testing. A normally closed set of contacts of a relay is interposed in the wiring between the module and the valve. This relay is part of an automatic shut-down circuit that uses several principal components of a known shut-down system along with two additional relays and three diodes to provide the engine with an automatic shut-down system that is independent of the engine's electronic control module, yet that will not disconnect the fuel shut-off solenoid valve from the electronic control module during diagnostic engine testing.

7 Claims, 2 Drawing Sheets

CIRCUIT FOR AUTOMATIC SHUT-DOWN OF ELECTRONICALLY CONTROLLED DIESEL ENGINE

FIELD OF THE INVENTION

This invention relates generally to the control of internal combustion engines, particularly to electronically controlled diesel engines and shut-down circuits for diesel engines. Diesel engines and automatic shut-down systems for such engines find significant use in heavy trucks.

BACKGROUND AND SUMMARY OF THE INVENTION

Electronically controlled diesel engines are known. So are automatic shut-down systems for diesel engines. However, the diagnostic requirements for certain electronically controlled diesel engines are incompatible with certain automatic shut-down systems, and as a consequence, it has heretofore not been possible to equip such engines with such automatic shut-down systems.

The present invention relates to a circuit that enables such engines to be equipped with an automatic shut-down system that utilizes the same principal components used in such known automatic shut-down systems. While the broader principles of the invention are not necessarily limited to the specific engines for which the problem was solved, nor to the specific principal components of the known automatic shut-down system used in implementing the solution, it can be said that the specific engines involved are certain Cummins diesel engines bearing the name CELECT, and the known automatic shut-down system components are the same as used in certain alarm and shut-down systems manufactured by Kysor Industrial Corporation of Cadillac, Mich. and described in U.S. Pat. No. 3,602,207.

One of the diagnostic requirements for the CELECT engine is that the fuel shut-off solenoid valve remain connected to the electronic control module in the diagnostic mode. This requirement made it impossible for the known Kysor automatic shut-down systems to be installed on a CELECT engine because they commanded engine shut-down by interrupting the current to the fuel shut-off solenoid valve, and with the engine in the diagnostic mode and the ignition switch on, the system would detect what appeared to be a condition calling for engine shut-down, and consequently disconnect the fuel shut-off solenoid valve from the electronic control module even though the engine was not running.

One proposed solution for this problem was to provide a push-button switch that could be actuated to disable the automatic shut-down system during performance of the diagnostic test on the engine. The problem with that proposal was that it required the attendance of an extra person to hold the switch actuated while the test was being performed. The use of a toggle switch was suggested instead, but that too was rejected because of the risk that it would be forgotten to de-activate the switch after the diagnostic test, thereby keeping the automatic shut-down system disabled when the engine returned to running operation. Also proposed was a circuit for diagnostics that would disengage automatically in response to engine starting, but this was rejected because of the extra operation required to reclose the circuit between the electronic control module and the fuel shut-off solenoid valve. Ultimately, the circuit that is disclosed herein was created and found to be acceptable for enabling the involved engines to be equipped with automatic shut-down systems using the major components of the known automatic engine shut-down system.

An engine embodying a circuit in accordance with principles of the invention comprises the addition of a relatively small number of principal circuit components, specifically three relays and three diodes. These additional components are conventional and readily available. Two embodiments of the invention will be disclosed, one being a two-way system, and the other, a three-way system. The two-way system automatically shuts the engine down due to either loss of engine lubrication system pressure or excessively high engine coolant temperature. The three-way system automatically shuts the engine down due to either loss of engine lubrication system pressure or excessively high engine coolant temperature or excessive loss of coolant from the cooling system.

Further features, advantages, and benefits of the invention will be seen in the ensuing detailed description of a presently preferred embodiment that is constructed according to the best mode contemplated at this time for carrying out the invention. The description refers to accompanying drawings.

BRIEF DESCRIPTION OF THE DRAWINGS

FIG. 1 depicts a two-way system.

FIG. 2 depicts a three-way system.

DESCRIPTION OF THE PREFERRED EMBODIMENT

Figure 1:
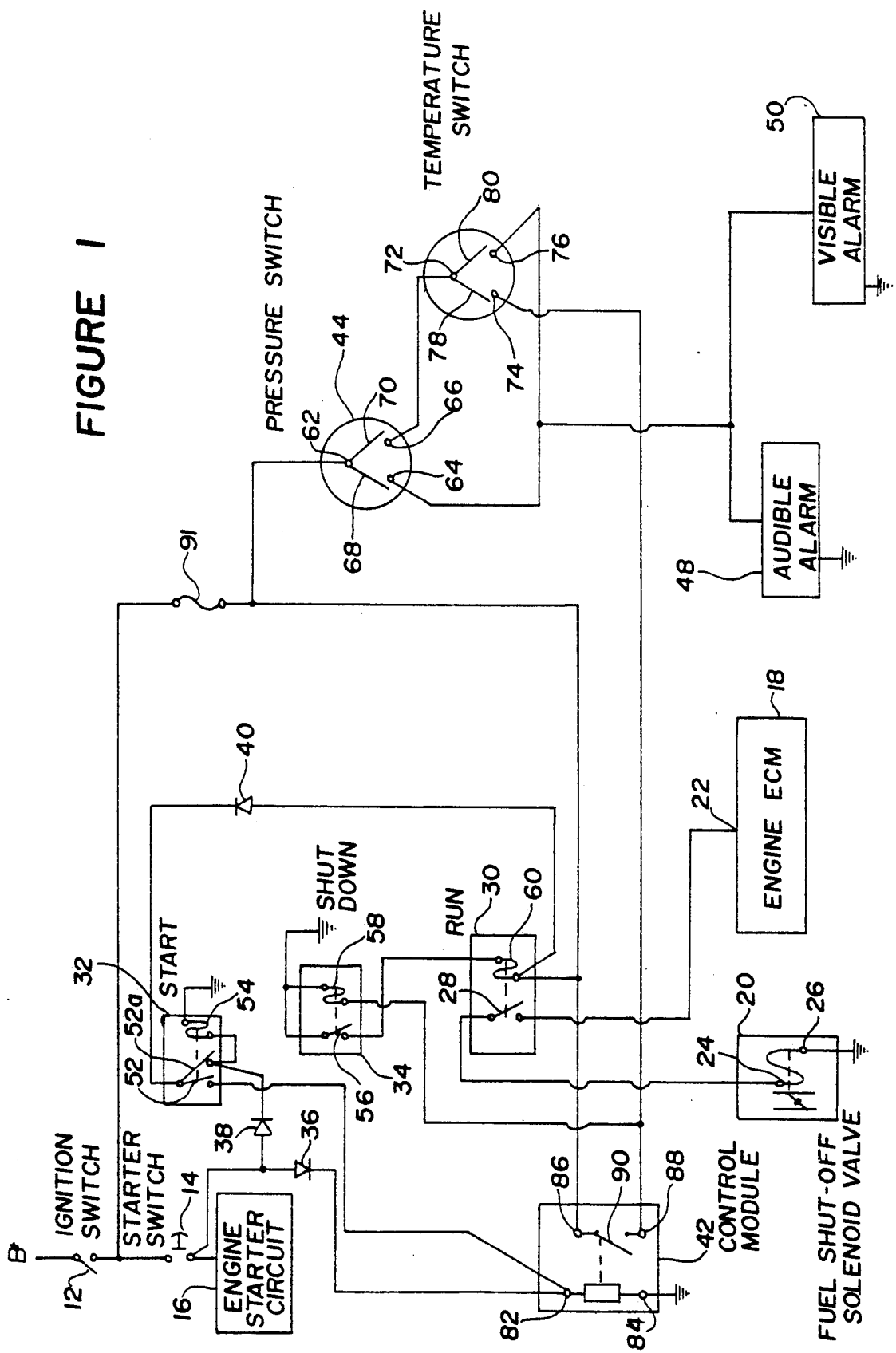
FIG. 1 is a schematic diagram of a first embodiment of circuit for automatically shutting down an electronically controlled engine without interfering with engine diagnostic testing; specifically

FIG. 1 shows that portion of the electrical system of a diesel engine that is relevant to the invention. It includes a conventional ignition switch 12 that is selectively operated on and off by the operator for respectively connecting and disconnecting electric power to and from the engine electrical system including that portion specifically illustrated in FIG. 1. The power is switched from an associated D.C. storage battery that is not specifically shown but rather is depicted by symbols representing B+ voltage and ground. When ignition switch 12 is operated on (i.e. closed), B+ battery voltage is delivered to an input terminal of a pushbutton starter switch 14. Starter switch 14 has a load terminal that is connected both to a conventional engine starter circuit 16 and to additional circuitry embodying the inventive principles. Having turned ignition switch 12 on, the operator starts the engine by depressing pushbutton switch 14, releasing it once the engine has started.

The diesel engine is electronically controlled by an electronic control module (ECM) 18 that performs a number of different control functions. One of these control functions is the control of a fuel shut-off solenoid valve 20. ECM 18 has a number of output terminals, the illustrated one of which is an output terminal 22 that is connected by a current path to an input terminal 24 of the solenoid of fuel shut-off solenoid valve 20. The solenoid of valve 20 has another terminal 26 that is grounded. This current path includes a set of normally closed contacts 28 of a run relay 30, and the inclusion of run relay 30 forms part of the inventive circuit. Absent the automatic shut-down feature provided by the inventive circuit, terminal 22 would be direct wired to terminal 24.

ECM 18 functions to command a positive voltage at terminal 22 for delivering energizing current to the terminal 24 of fuel shut-off solenoid valve 20 whenever the ECM commands that fuel from a fuel supply (not shown) be made available to the engine's fuel system. This energizing opens the normally closed valve 20. When the current terminates, the fuel supply is shut off because valve 20 returns to normally closed. By including run relay 30 and the remainder of the inventive circuitry that is to be described, the engine is endowed with an automatic shut-down feature that is independent of whatever shut-down may be provided by ECM 18 and is in fact capable of shutting the engine down under certain conditions even though ECM 18 may not, for whatever reason, be commanding a shut-down. Thus, it is possible that the inventive circuit will provide an extra measure of protection beyond whatever is provided by ECM 18. Yet in doing so, and as will be subsequently seen, the inventive circuit does not impair the ability to perform diagnostic testing of the engine which requires continuity of the current path between terminal 22 and terminal 24 when ignition switch 12 is on and the engine is not running.

The inventive circuit further comprises a start relay 32, a shut-down relay 34, three diodes 36, 38, and 40, a shut-down control module 42, a pressure sensing switch 44, a temperature sensing switch 46, an audible alarm 48, and a visible alarm 50.

Start relay 32 comprises a set of normally closed contacts 52, a set of normally open contacts 52a, and an operating coil 54, and is configured to be self-latching to hold closed the normally open contacts 52a when energized. Shut-down relay 34 comprises a set of normally closed contacts 56 and an operating coil 58. Run relay 30 also has normally closed contacts 28, as mentioned, and comprises an operating coil 60. Relays 30, 32, and 34, and diodes 36, 38, and 40 are entirely conventional.

Shut-down control module 42, pressure sensing switch 44, and temperature sensing switch 46 are also conventional; specifically being major components of known Kysor automatic shut-down systems. Pressure sensing switch 44 bears the commercial name PRESSURESTAT, and temperature sensing switch 46, the name ALARMSTAT.

Switch 44 has three terminals: a common terminal 62, and two output terminals 64 and 66. Internally between terminals 62 and 64, switch 44 has a set of normally closed contacts 68, and between terminals 62 and 66, a set of normally open contacts 70. The switch is mounted on the engine to sense the pressure of lubricant being pumped in the engine lubrication system. Sufficiently high lubrication pressure is an indication that the engine is not receiving insufficient lubrication while lesser pressures indicate otherwise. When the engine is not running, no lubricating pressure is being developed, and hence the two sets of contacts 68 and 70 assume their normal states. After the engine has been started and is running with acceptably high lubricating pressure, they switch. If the pressure thereafter drops below acceptably high levels, contacts 68 re-close and contacts 70 re-open, but contacts 68 re-close at a pressure that is somewhat higher (4-5 psi is typical) than that at which contacts 70 re-open.

Switch 46 has three terminals: a common terminal 72, and two output terminals 74 and 76. Internally between terminals 72 and 74, switch 46 has a set of normally closed contacts 78, and between terminals 72 and 76, a set of normally open contacts 80. The switch is mounted on the engine to sense the temperature of the engine by sensing the temperature of the engine's coolant. Sufficiently low temperature is an indication that the engine is not running excessively hot while higher temperatures indicate otherwise. When the engine is not excessively hot, the two sets of contacts 78, 80 assume their normal states. When the engine begins to run excessively hot, they switch, but contacts 80 close at a temperature that is somewhat lower (6° F. lower is typical) than that at which contacts 78 open.

Control module 42 has four terminals 82, 84, 86, and 88. It operates like a time delay on de-energization relay having a control input at terminal 82 with terminal 84 being grounded. Control module 42 controls a set of normally open contacts 90 that are between terminals 86 and 88.

The components are wired as shown. The load side of ignition switch 12 is wired through a fuse 91 to terminals 62 and 86 and to one side of coil 60. Diode 40 is connected, poled as shown, between that same side of coil 60 and one side of contacts 52. The other side of contacts 52 and terminal 82 are commonly connected, and diode 36 is connected, poled as shown, between that common connection and the load side of starter switch 14. Diode 38 is connected, poled as shown, between the load side of starter switch 14, the normally open side of contacts 52a, and one side of coil 54. The other side of coil 54 is grounded. The other side of coil 60 is wired to one side of contacts 56 while the other side of those contacts is grounded. Terminals 88 and 74 and one side of coil 58 are commonly connected. The other side of coil 58 is grounded. Terminal 66 is wired to terminal 72. One side of each alarm device 48 and 50 is grounded while the opposite side of each and terminals 64 and 76 are commonly connected.

The circuit operates as follows. When ignition switch 12 is off, the circuit assumes the condition shown in FIG. 1. Because run relay 30 is not being energized, contacts 28 are closed, and the current path from terminal 22 of ECM 18 to terminal 24 of fuel shut-off solenoid valve 20 has continuity. However, because power is also removed from ECM 18 at this time due to ignition switch 12 being off, valve 20 remains closed.

When ignition switch 12 is turned on, but before starter switch 14 is actuated, B+ battery voltage is delivered to terminal 86 of control module 42, to terminal 62 of switch 44, to one side of coil 60 of relay 30, and through diode 40 to one side of contacts 52 of start relay 32. Because the other side of coil 60 is being grounded through contacts 56 of shut-down relay 34, coil 60 now draws energizing current, causing contacts 28 to open. Because contacts 52 are closed, the B+ battery voltage (less diode drop) is also delivered to terminal 82 of control module 42 upon switching the ignition on, and it draws current resulting in contacts 90 closing. The closing of contacts 90 transmits the B+ battery voltage at terminal 88 to coil 58 of shut-down relay 34, causing coil 58 to draw current and operate contacts 56 to open. The opening of contacts 56 drops out run relay 30, causing contacts 28 to re-close and thereby restore continuity of the current path from ECM 18 to the fuel shut-off solenoid valve 20, thereby opening the valve and allowing fuel to be supplied to the engine. However, because the engine has not yet been started, pressure switch 44 detects what appears to be unacceptably low lubrication system pressure, and hence alarms are given by devices 48 and 50 on account of current flow through contacts 68.

At this point, with the ignition on, the fuel shut-off valve 20 open, and the engine not running, the automatic shutdown system is also configured to meet the necessary requirements of the engine manufacturer to permit operation of the ECM 18 in the diagnostic mode to conduct diagnostic testing of the engine. The details concerning the operation of the ECM in the diagnostic mode are beyond the scope of the present invention.

In normal operation, the engine next is started by pushing starter switch 14. Current flows through both switches 12 and 14 and through diode 38 to coil 54, causing start relay 32 to pull in, and because it is configured to be self-latching upon energization, the start relay latches in the pulled-in condition. The self-latching of coil 54 is provided by current through ignition switch 12, diode 40, and the normally open contacts 52a which are now closed. The operation of contacts 52 disconnects terminal 82 of control module 42 from the cathode of diode 40, but so long as starter switch 14 remains actuated closed, B+ battery voltage is still seen by terminal 82 through diode 36, and current continues to flow to terminal 82. Once starter switch 14 is released however, its re-opening stops the current into terminal 82, and this allows control module 42 to begin timing out. Contacts 90 remain closed during the timing out (which is about 30 seconds), and upon re-opening, prevent shut-down relay 34 from continuing to be pulled in by current from control module 42. By this time however, the running engine will, if properly operating, have developed sufficient lubricant pressure without overheating so that switch 44 has been operated to close contacts 70 while contacts 78 of temperature switch 46 have remained closed, and as a result, shut-down relay 34 continues to be pulled in by current flow through switches 44 and 46 from ignition switch 12. This condition ensues so long as the engine continues to operate properly. (It may be noted that once sufficient lubricant pressure is sensed by switch 44, the alarms cease.)

The automatic shut-down will occur in either one of the following two ways. If the engine lubricating system pressure drops below an acceptable level, contacts 68 first re-close, causing alarms to be given. This is intended to alert the operator to an impending engine shut-down. Further loss of pressure (4-5 psi additional, typically) results in contacts 70 re-opening. This stops the current to coil 58 of shut-down relay 34, causing contacts 56 to re-close. The reclosing of contacts 56 drops out run relay 30, opening contacts 28. The result is that the current path to the solenoid valve 20 is interrupted, causing the fuel supply to be disconnected from the engine, and consequently, the engine to shut down due to lack of fuel.

The same sequence of events will happen if the engine overheats, but in such case the alarms are first given by the closing of contacts 80, and the subsequent drop-out of shut-down relay 34 is caused by the opening of contacts 78.

The use of the diodes prevents feed-backs that would adversely affect the circuit. The diode 38 is to prevent feedback from closed contacts 52a at coil 54 to terminal 82 and the starting circuit. Diode 36 is to prevent feedback from terminal 82 to coil 54 and the starting circuit. These diodes are required due to the need to feed both at the same time from the starter switch. A starter circuit that had separate poles, each for respective connection to a respective one of coil 54 and terminal 82, would eliminate the need for these two diodes.

Thus, the engine can be automatically shut down by circuitry that is independent of ECM 18. Yet when the electronically controlled engine is subject to diagnostic testing which requires that the ignition be on without the engine running and that continuity of the current path between ECM 18 and solenoid valve 20 not be interrupted by the automatic shut-down circuit, such continuity is assured by the inventive circuit despite the appearance to switch 44 that shut-down should be commanded. Moreover, this assurance is given without the necessity for human intervention. Furthermore, the inventive circuit enables a separate automatic shut-down system to be associated with an electronically controlled engine without including manually operated switches for disconnecting or overriding the automatic shut-down system for diagnostic testing of the electronically controlled engine. It should be noted that both switches 44 and 46 operate in the same way as the known Kysor systems do upon detecting an incipient condition calling for engine shut-down for the purpose of avoiding damage to the engine. This mode of operation causes alarms to be given somewhat in advance of actual engine shut-down so as to allow the operator some measure of time for taking appropriate action in most situations.

Figure 2:
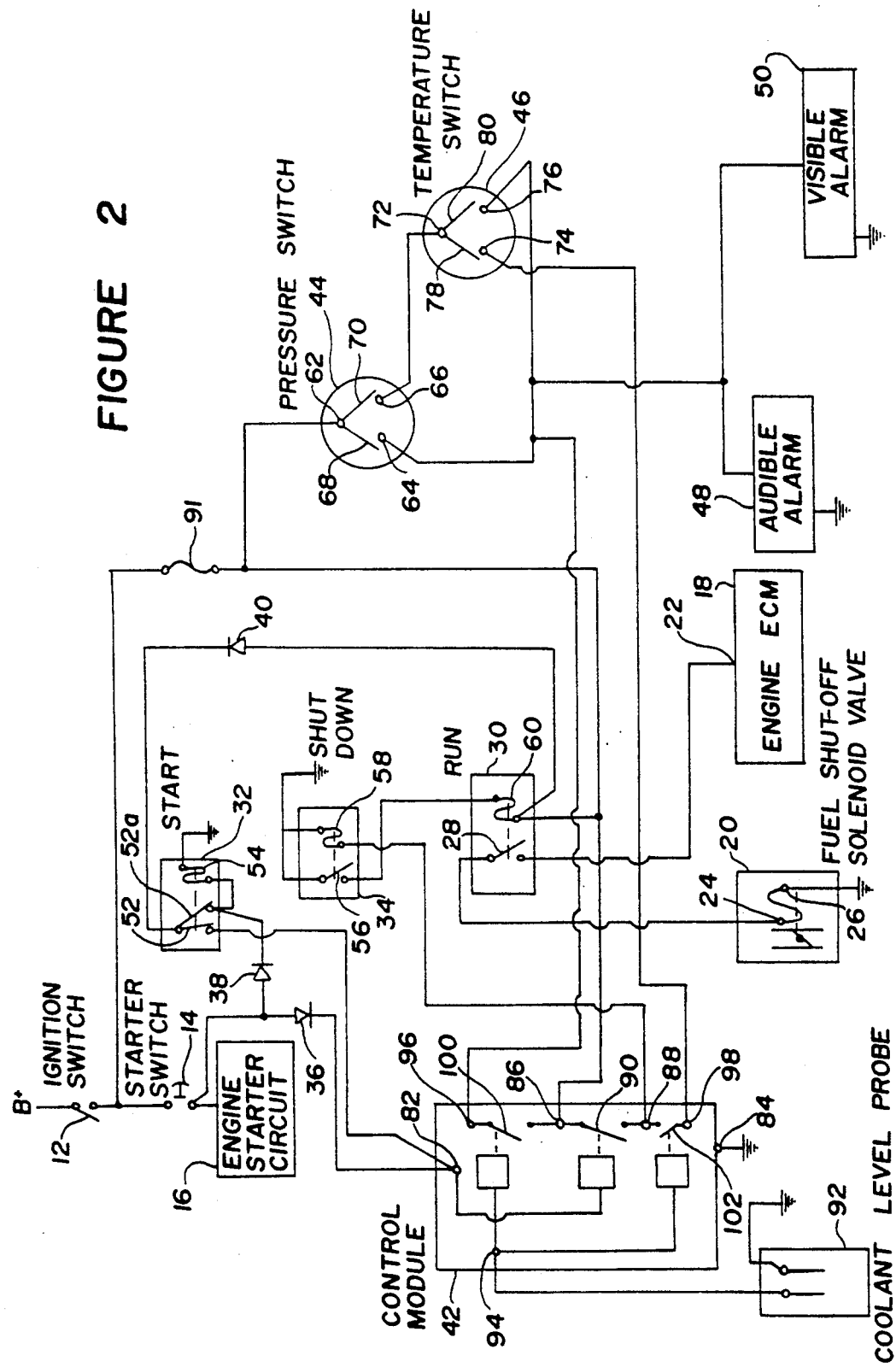
FIG. 2 is a schematic diagram of a second embodiment of circuit for automatically shutting down an electronically controlled engine without interfering with engine diagnostic testing; specifically

The inventive circuit disclosed in FIG. 1 is referred to as a two-way type. The inventive circuit of FIG. 2 that is now to be described is referred to as a three-way type, and it is quite similar to that of FIG. 1 in that it comprises the same components, similarly numbered, with the exception that control module 42 is replaced by a different one 42' and a coolant level probe 92 is also incorporated. The probe 92 and control module 42' can be the same parts as are used in the previous three-way version of the Kysor Alarm and Shutdown system.

Probe 92 is disposed to sense the level of coolant in the engine cooling system. If the probe senses an acceptable coolant level, it delivers a ground to a terminal 94 of control module 42' to which it is wired. A loss of coolant that results in less than an acceptable level causes the probe to deliver an open circuit to terminal 94. Further differences between FIG. 2 and FIG. 1 reside in a connection between another terminal 96 of control module 42' and the common connection of alarm devices 48 and 50 and terminals 64 and 76, and in the connection of terminal 74 to a further terminal 98 of control module 42', rather than to terminal 88 as in FIG. 1.

Terminal 94 forms an input to control module 42' for controlling a set of contacts 100 that is internal to the control module between terminals 86 and 96 and a set of contacts 102 that is also internal to the control module between terminals 88 and 98. Contacts 100 are normally closed, but are operated open by control module 42' and remain in that state so long as probe 92 senses a satisfactory coolant level. When the probe ceases to sense a satisfactory coolant level, contacts 100 revert to closed, causing the alarms to be given. Contacts 102 are normally open, but are operated closed so long as probe 92 senses a satisfactory coolant level. Upon probe's 92 detection of loss of satisfactory coolant level, control module 42' begins timing out, and upon elapse of a certain time showing continued loss of satisfactory coolant level (typically 30 seconds), contacts 102 revert to open. This re-opening of contacts 102 drops out shut-down relay 34, causing pull-in of run relay 30 and the consequent closing of solenoid valve 20 to shut down the engine.

The operation of switches 44 and 46 to give the alarms and shut the engine down occurs in the same way as in the circuit of FIG. 1. Functionally then, the circuit of FIG. 2 operates in the same way as that of FIG. 1 with the additional feature of shutting down the engine upon detection of loss of satisfactory coolant level. In view of the previous detailed description of operation of the circuit of FIG. 1, further detailed description of the operation of the circuit of FIG. 2 insofar as its response to switches 44 and 46 is concerned would be repetitious.

While a presently preferred embodiment of the invention has been illustrated and described, it should be appreciated that principles are applicable to other embodiments that fall within the scope of the following claims.

What is claimed is:

1. An internal combustion engine comprising:
   an ignition switch that is selectively operated on and off respectively to respectively connect and disconnect electric current from an electric power source to and from circuitry associated with the engine,
   a fuel shut-off solenoid valve that is selectively operable to open and close a fuel supply to the engine, said fuel shut-off solenoid valve being closed and open respectively by the absence and presence respectively of energizing current to it,
   an electronic engine control module for exercising control over certain engine functions including control of said fuel shut-off solenoid valve by commanding said energizing current to be supplied to said fuel shut-off solenoid valve via a current path between said electronic engine control module and said fuel shut-off solenoid valve, said electronic engine control module having a diagnostic mode, operative with the engine not running but with the ignition switch on, requiring continuity of said current path to said solenoid valve; and
   an engine shut-down circuit operative with the engine running and the ignition switch on but functioning separately from said electronic engine control module for shutting the engine down upon the occurrence of one or more conditions indicative of a need to stop the engine for the purpose of avoiding permanent damage thereto, said shut-down circuit including:
   one or more detection sensors for detecting the occurrence of said one or more conditions,
   switch means interposed in said current path between said electronic control module and said fuel shut-off solenoid valve,
   an electrical connection between said ignition switch and an operating means associated with said switch means,
   shut-down switch means effective when said ignition switch is on and the engine is running to cause said switch means to maintain said current path closed prior to said one or more detection sensors detecting said one or more conditions, said shut-down switch means effective upon said one or more detection sensors detecting said one or more conditions to cause said switch means to open said current path, thereby interrupting said energizing current and causing said fuel shut-off solenoid valve to close and shut off fuel to the engine; and
   means causing said switch means to be closed when the engine is not running and said ignition switch is on.

2. An internal combustion engine as set forth in claim 1 in which said one or more conditions is selected from a group of conditions which comprises: loss of engine lubricant pressure, excessively high engine temperature, and loss of engine coolant.

3. An internal combustion engine as set forth in claim 2 including alarm means for giving an alarm indicative of incipiency of said one or more conditions.

4. An internal combustion engine as set forth in claim 1 in which said switch means is a set of normally closed contacts of a relay having a coil that, when the ignition switch is on, the engine is running and one of said one or more conditions is present, is supplied with current from said ignition switch to operate said normally closed contacts to open.

5. An internal combustion engine as set forth in claim 4 wherein said shut-down switch means comprises a second relay having a second set of normally closed contacts and a second coil that, when supplied with current, operates said second set of normally closed contacts to open, and further including first wiring connecting the first-mentioned coil of the first-mentioned relay in series with said second set of normally closed contacts, second wiring connecting said second coil to said one or more detection sensors, and third wiring connecting said one or more detection sensors to said ignition switch such that current from the electric power source is fed from said ignition switch to said detection sensors when said ignition switch is on, said engine is running and each of said one or more conditions is absent, said detection sensors in turn feed the current from said ignition switch to said second coil to cause said second coil to be energized, and in response to detection of said one or more conditions, said one or more detection sensors interrupt the feed of current from said ignition switch to said second coil causing said second coil to be de-energized and said second set of contacts to revert to normally closed thereby causing current from said ignition switch to energize the first-mentioned coil and open the first-mentioned set of normally closed contacts.

6. An internal combustion engine as set forth in claim 5 including a starter switch that is fed in series from said ignition switch for starting the engine, a third relay having a third set of normally closed contacts, a set of normally-open contacts, and a third coil that, when supplied with current, operates said third set of normally closed contacts to open and said normally-open contacts to close, said normally-open contacts comprising latching means for latching said third relay to maintain current through said third coil after it has operated said third set of normally closed contacts to open, fourth wiring including a diode connecting said third set of normally closed contacts to said ignition switch to provide for flow of current from said ignition switch to said third set of normally closed contacts when said ignition switch is on, fifth wiring connecting said starter switch to said third coil to provide for flow of current from said starter switch to said third coil when said ignition switch and said starter switch are both on such that said third set of normally closed contacts is operated to open by current flow from said starter switch through said fifth wiring and are maintained open by current flow through said fourth wiring upon reversion of said starter switch to off, said engine shut-down circuit further including a shut-down control module that contains a fourth set of contacts under the control of said control module, sixth wiring connecting said fourth set of contacts in series between said ignition switch and said second coil of said second relay such that said fourth set of contacts is in parallel with said detection sensors between said ignition switch and said second coil, seventh wiring connecting said shut-down control module to said starter switch, said shut-down control module causing said fourth set of contacts to be closed by current flow through said seventh wiring when said ignition switch and said starter switch are both on, said shut-down control module further causing said fourth set of contacts to be maintained closed for a certain amount of time after reversion of said starter switch to off and upon elapse of said certain amount of time to revert to open, said one or more detection sensors comprising means responsive to the engine having started running and to the absence of each of said one or more conditions within a limited time after the engine has started running for conducting current from said ignition switch to said second coil thereby maintaining said second set of contacts open after elapse of said certain amount of time so long as each of said one or more conditions continues to be absent, and said one or more detection sensors also comprising means responsive to said one or more conditions to interrupt the current to said second coil from said ignition switch thereby causing said second set of contacts to revert to closed and the first-mentioned coil to in turn operate the first-mentioned contacts to open, and further including feed-back prevention means for preventing feedback from said third coil to said shut-down control module and vice versa due to said fifth and seventh wiring to said starter switch.

7. An internal combustion engine as set forth in claim 6 in which said feed-back prevention means comprises two diodes, one in said fifth wiring and the other in said seventh wiring.

* * * * *